US007609965B2

(12) United States Patent
Nahm (10) Patent No.: US 7,609,965 B2
(45) Date of Patent: Oct. 27, 2009

(54) METHOD FOR REORGANIZING WAVELENGTH DIVISION MULTIPLEXING NETWORK USING DYNAMIC WATERMARKS

(75) Inventor: Jung-Joo Nahm, Seoul (KR)

(73) Assignee: Pantech Co., Ltd., Seoul (KR)

( * ) Notice: Subject to any disclaimer, the term of this patent is extended or adjusted under 35 U.S.C. 154(b) by 903 days.

(21) Appl. No.: 10/744,794

(22) Filed: Dec. 22, 2003

(65) Prior Publication Data

US 2004/0218925 A1 Nov. 4, 2004

(30) Foreign Application Priority Data

Apr. 30, 2003 (KR) .................... 10-2003-0027882

(51) Int. Cl.
*H04J 14/00* (2006.01)
*H04B 17/00* (2006.01)
*H04L 12/28* (2006.01)

(52) U.S. Cl. ...................... 398/57; 398/34; 370/237; 370/255

(58) Field of Classification Search .................. 398/34, 398/57; 370/237, 255
See application file for complete search history.

(56) References Cited

U.S. PATENT DOCUMENTS

| 6,381,046 | B1 | 4/2002 | Wilfong et al. | |
| 6,744,984 | B1* | 6/2004 | Faruque et al. | 398/57 |
| 2003/0039010 | A1* | 2/2003 | Akimoto et al. | 359/152 |
| 2003/0161633 | A1* | 8/2003 | Oki et al. | 398/57 |

FOREIGN PATENT DOCUMENTS

| JP | 2001-069087 | 3/2001 |
| JP | 2001-274755 | 10/2001 |
| KR | 2003-17123 | 3/2003 |

OTHER PUBLICATIONS

Virtual-topology adaptation for WDM mesh networks under dynamic traffic; Gencata et al.; INFOCOM 2002. Twenty-First Annual Joint Conference of the IEEE Computer and Communications Societies. Proceedings; vol. 1, 2002 pp. 48-56.*
Nahm, Jung-Joo, Loadbalancing for WDM network using dynamic watermarks, Computer Science in Seogang University, Dec. 2002.*

(Continued)

*Primary Examiner*—Nathan M Curs
(74) *Attorney, Agent, or Firm*—H.C. Park & Associates, PLC (57) ABSTRACT

Disclosed is a method of reorganizing a wavelength division multiplexing network using dynamic watermarks and a computer readable recoding medium for storing a program for executing the same method. The reorganization method of organizing a wavelength division multiplexing (WDM) network using a dynamic watermark of the invention includes the steps a) collecting load information for optical paths of the WDM network from nodes on the optical paths; b) detecting optical paths having maximum load and minimum load from the collected load information and computing a maximum value and a minimum value based on the collected load information; and c) resetting an upper watermark and a lower watermark based on the maximum value and the minimum value.

4 Claims, 10 Drawing Sheets

OTHER PUBLICATIONS

Nahm, Jung-Joo, Loadbalancing for WDM network using dynamic watermarks, Computer Science in Seogang University, Dec. 2002, Only Abstract in English.

B. Mukherjee, D. Banerjee, S. Ramamurthy, and A. Mukherjee, "Some Principles for Designing a Wide-Area WDM Optical Network", IEEE/ACM Transactions on Networking, vol. 4, No. 5, pp. 684-695, Oct. 1996.

D. Banerjee and B. Mukherjee, "Wavelength-Routed Optical Networks: Linear Formulation, Resource Budgeting Tradeoffs, and a Reconfiguration Study", IEEE/ACM Transactions on Networking, vol. 8, No. 5, pp. 598-607, Oct. 2000.

R. M. Krishnaswamy and K. N. Sivarajan, "Design of Logical Topologies: A Linear Formulation for Wavelength-Routed Optical Networks with No Wavelength Changers", IEEE/ACM Transactions on Networking, vol. 9, No. 2, pp. 186-198, Apr. 2001.

A. Narula-Tam and E. Modiano, "Dynamic Load Balancing for WDM-based Packet Networks", Proceedings of IEEE INFOCOM 2000, vol. 2, pp. 1010-1019, Mar. 2000.

A. Gencata and B. Mukherjee, "Virtual-Topology Adaptation for WDM Mesh Networks Under Dynamic Traffic", Proceedings of IEEE INFOCOM 2002, vol. 1 of 3, pp. 48-56, Jun. 2002.

K. Bala, G. Ellinas, M. Post, C. Shen, J. Wei and N. Antoniades, "Towards Hitless Reconfiguraion in WDM Optical Networks for ATM Transport", Proceedings of IEEE GLOBECOM 1996, pp. 316-320, Nov. 1996.

* cited by examiner

A: INVENTIVE METHOD
B: CONVENTIONAL METHOD

METHOD FOR REORGANIZING WAVELENGTH DIVISION MULTIPLEXING NETWORK USING DYNAMIC WATERMARKS

FIELD OF THE INVENTION

The present invention relates to a method of a reorganizing wavelength division multiplexing network using dynamic watermarks and a computer readable recoding medium for executing the same; and, more particularly, to a method of reorganizing a wavelength division multiplexing network using dynamic watermarks and a computer readable recording medium for executing the same to be suitable to a variation of traffic pattern, by varying high and low watermarks which are the bases of network reorganization depending on the degree of traffic variation.

DESCRIPTION OF RELATED ART

Recently, wavelength division multiplexing (WDM) and wavelength routing have been noticed as technologies for advanced backbone transmission network.

In a WDM network, it is possible to utilize hundreds of channels through the use of wide area bandwidth employing optical fiber. Since optical routers constituting WDM network are connected by optical fiber links in a point-to-point manner to one another, it is possible to transfer message without transforming the message into an electrical signal at intermediate nodes, when transmitting the message from an origination node to a destination node in the WDM network.

In the WDM network, optical paths can be reorganized, thereby the WDM network can be optimized actively in a circumstance of variety traffic patterns. In other words, the network can be optimized by designing a virtual topology which is represented by a set of optical paths according to an expected variation of traffic patterns.

Figure 1A:
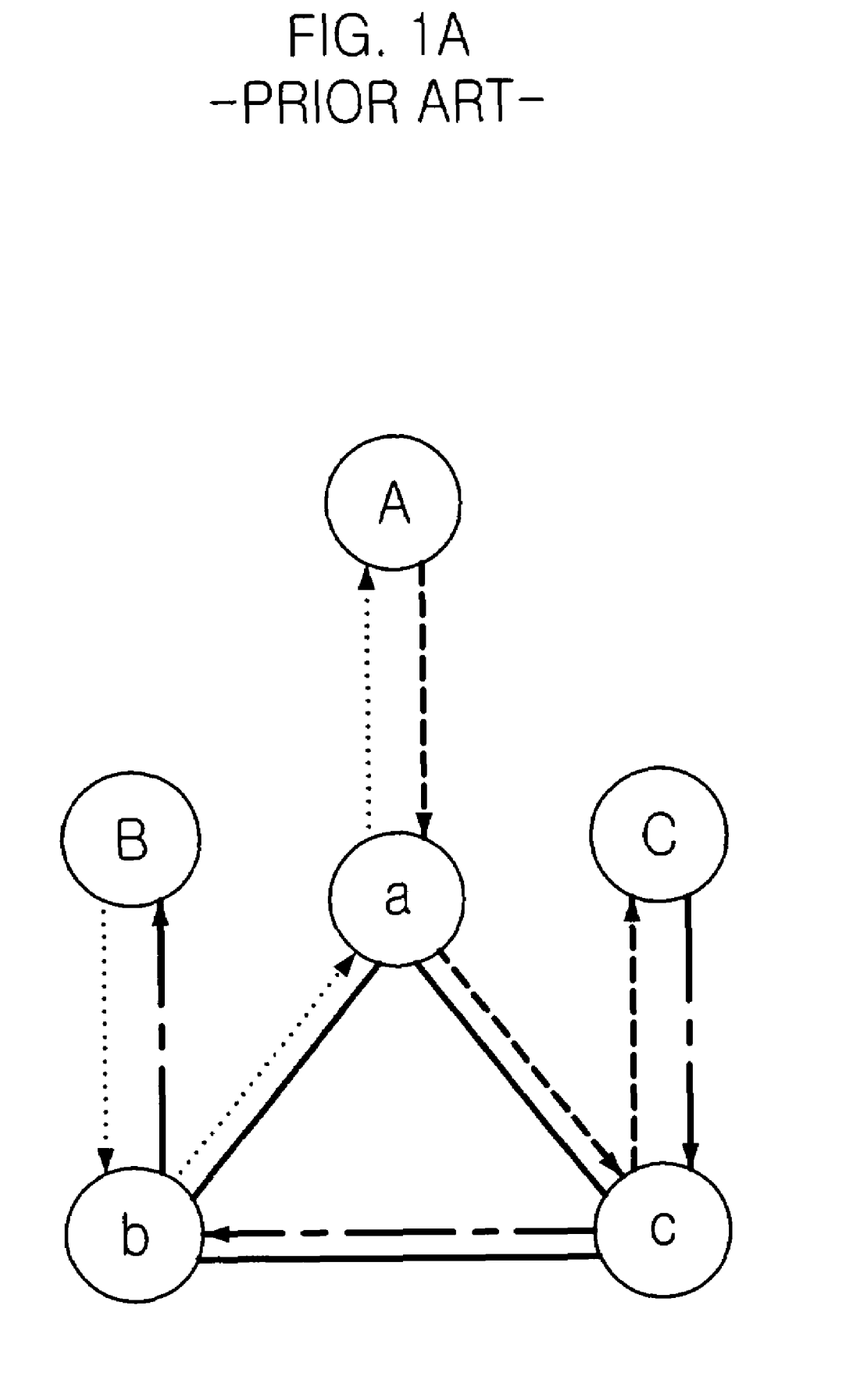
FIGS. 1A and 1B are diagrams representing the structures of conventional WDM networks.
Figure 1B:
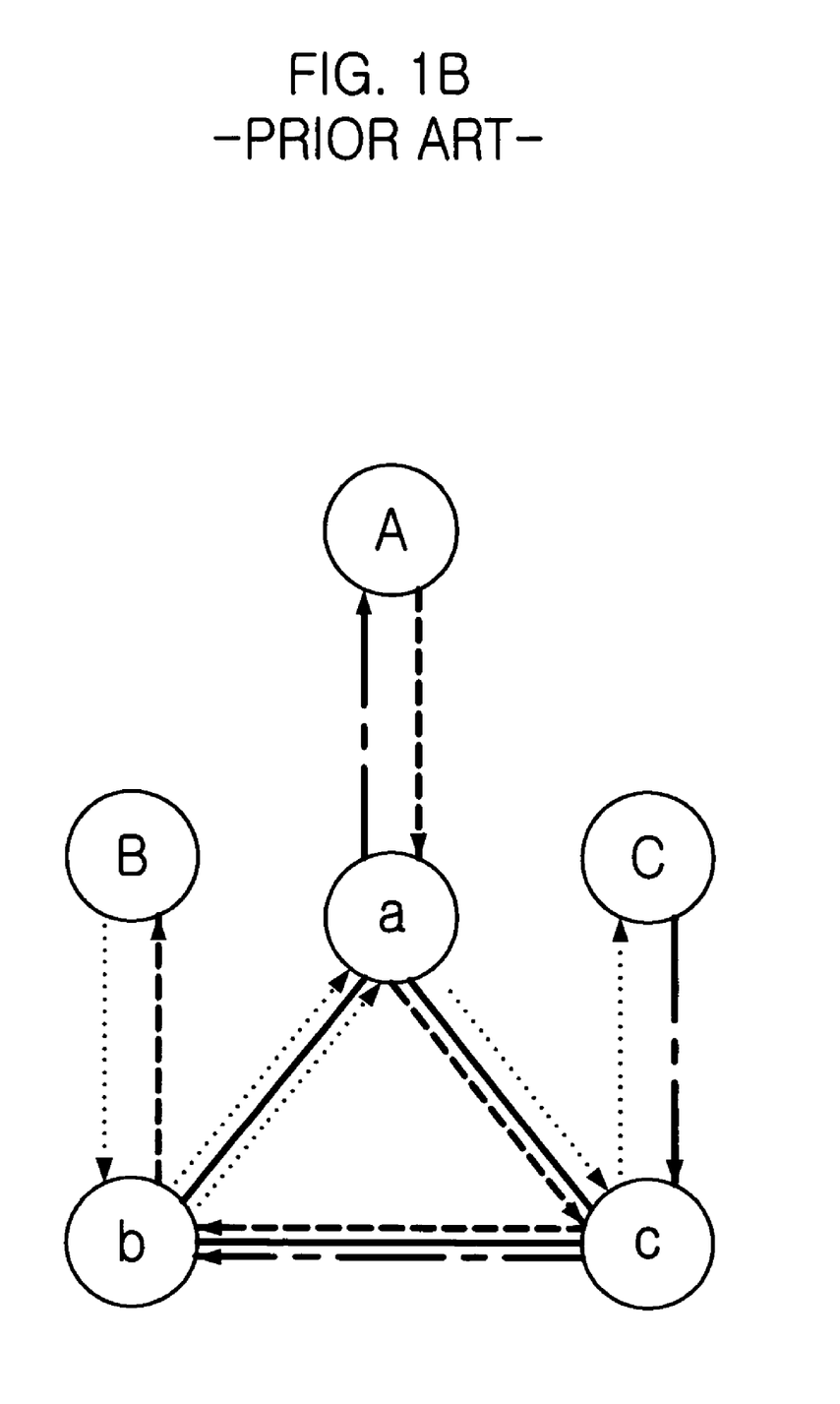

FIGS. 1A and 1B are diagrams representing a structure of general WDM networks for explaining a virtual topology which is implemented in clockwise direction and counterclockwise direction, respectively. In FIGS. 1A and 1B, the capital letter and small letter of the same alphabetical letter consist of one node, and the small letter indicates an optical router of the node.

Links represented by solid lines between the optical routers are substantially physical optical fiber links. It can be seen that there are all physically identical topologies in both clockwise direction and counterclockwise direction.

Referring to dotted lines, in a virtual topology of clockwise direction, a message is transferred to a node B through an optical router b of the node B from an optical router c after transferring it to the optical router c, starting at a node C. Other paths in FIG. 1A are made to be identical with the path as described above, thereby making the virtual topology of clockwise direction.

In case of FIG. 1B, a message starts at a node C and arrives at a node A through an optical router a of the node A, without transforming it to an electrical signal, by way of an optical router b of a node B via an optical router c of a node C. Other signals are transferred in the same manner as mentioned above; and, therefore, it can be seen that virtual topology of counterclockwise direction is made as in FIG. 1B.

As described above, WDM networks of FIGS. 1A and 1B have the same physical topology, while they have different efficiencies for a traffic matrix expressed as:

$$\begin{array}{c} A\ B\ C \\ \begin{array}{c}A\\B\\C\end{array}\begin{bmatrix} 0 & 1 & 0 \\ 0 & 0 & 1 \\ 1 & 0 & 0 \end{bmatrix} \end{array} \qquad \text{Eq. (1)}$$

That is, the virtual topology of FIG. 1A is less efficient for the traffic matrix as in Eq. (1). This is because the virtual topology of FIG. 1A needs more transformation between optical signal and electrical signal which requires a relatively long time compared to a propagation delay time of traffic.

Because of the above problem, in case that physical topology, set of wavelengths, limitation of the number of transmitting and receiving ports at each node, etc., are given, most prior studies were intended to find a virtual topology which was most suitable to an expected future traffic pattern.

In other words, in case that a current virtual topology and a future virtual topology are given, the relevant studies mainly concern the reorganization techniques of virtual topology which is most efficient to the given future traffic pattern.

An example of such prior studies is article 1 (B. Mukherjee, D. Banerjee, S. Ramamurthy, and A. Mukherjee, "Some principles for designing a wide-are WDM optical network", IEEE/ACM Transactions on Networking, vol. 4, no. 5, pp. 684-696, October 1996). Article 1 finds a virtual topology which is most adapted to future traffic pattern given in current virtual topology for enhancement of NSFNET which is a backbone network of the United States of America.

Specifically, article 1 first formulates the subject for design of a virtual topology. And then, it defines a target function for minimization of an average packet delay time of entire network and maximization of scaling element for traffic matrix.

For this, article 1 employs a flow deviation technique for routing of pack to employ less congested path for routing of packet traffics, wherein its entire algorithm uses simulated annealing formation.

The flow deviation technique is briefly explained below.

In this technique, traffic is first routed by using the shortest distance technique. After routing, a path which causes traffic congestion due to traffic concentration is searched. This technique is called recursive method for routing a part of traffic using the path searched to a less congestive path.

Now, simulated annealing for searching an optimized virtual topology is briefly described, as a method to enhance local search system.

First, an initial solution is set. And then, there are repeatedly carried out changes of the initial solution or changes of constant probability. That is, a new solution is obtained by varying the initial solution randomly. If the new solution is relatively good compared to the initial solution, then the initial solution is changed to the new solution; otherwise, the method for changing the constant probability is repeatedly performed.

Since the local searching always changes to a better solution compared to a previous solution, it is possible to promptly find a locally optimized solution, whereas the changed solution is not an optimized solution in global area. However, since the simulated annealing performs a change to worse solution in the constant probability, it is possible to find an optimized solution in the global area compared to the local searching.

However, article 1 includes several shortcomings as follows.

Firstly, there exists a shortcoming that the target function and defined limitation matters are nonlinear. That is to say, since they are defined by a nonlinear formula, it is difficult to derive actually optimized virtual topology.

Secondly, there is a problem that the limitation matters to actually existing wavelength are not considered. That is, routing and wavelength assigning processes are performed under the assumption that the number of available wavelengths is infinite.

Thirdly, it is assumed that future traffic pattern is given. However, in reality, the future traffic pattern is irregular and thus impossible to know.

To solve the above-mentioned problems, there is proposed article 2 (D. Banerjee and B. Mukherjee, "Wavelength-Routed Optical Networks: Linear Formulation, Resource Budgeting Tradeoffs, and a Reconfiguration Study", IEEE/ACM Transactions on Networking, vol. 8, no. 5, pp. 598-607, October 2000).

Article 2 linearly performs the nonlinear formulas which are the most important problem in the prior art technique, thereby deriving optimized solution. Further, the problems related to the wavelength can be solved by assuming wavelength transformation.

In article 2, a study was performed on the tradeoff between wavelength and network sources such as input and output ports of nodes.

If the number of wavelengths is limited, there may be a limitation to the entire performance enhancement although a multiplicity of ports is established at each node. Otherwise, if the number of ports at each node is relatively small, there may also be a limitation to the entire performance enhancement even when a multiplicity of wavelengths is available.

Article 2 defines the relationships between costs of terminals such as input and output ports at each node and exchange costs such as wavelengths, and proves through examination that optimal performance enhancement can be obtained by balancing the two relationships.

Details of article 2 which offers reorganization technique for virtual topology are as follows.

Solutions are first obtained by deriving each linear equation using current traffic matrix and given future traffic matrix. And then, among the obtained solutions, i.e., a plurality of virtual topologies which are suitable for the future traffic matrix, a virtual topology which is most similar to the current topology is selected and reorganized.

Among the many possible future virtual topologies, transformation of virtual topology which is most similar to the current topology is carried out, thereby simplifying retransmission and rebuffering processes of traffic being transferred, which occurs on network by a change of an optical path in the transformation.

Meanwhile, as another study, there is provided article 3 (R. M. Krishnaswamy and K. N. Sivarajan, "Design of logical topologies: A linear formulation for wavelength-routed optical networks with no wavelength changers", IEEE/ACM Transactions on Networking, vol. 9, no. 2, pp. 186-198, April 2001). Article 3 proposes a method employing linear formula which minimizes the target function value such as the average packet-hop distance and so on by formulating the number of available wavelengths, connection of topology, limitation matters of traffic routing, etc., in virtual topology.

However, article 3 also has a limitation that it is a study under the assumption that a future traffic pattern is known, and has a problem that it is impossible to find target virtual topology as the size of a network is large and the limitation matters to be considered increase.

Other problems of the prior art techniques for recognizing virtual topology are generally represented by two steps below.

Specifically, in the first step, most efficient virtual topology for new traffic pattern is designed. And in the second step, the new virtual topology designed in the first step is modified for current virtual topology.

However, this prior art technique requires the assumption that the future traffic pattern for performing the first step is known. Under the assumption in the first step, the modification of the virtual topology can be carried out in the second step.

The second step is a modification step between virtual topologies, wherein available network sources for data transmission are limited during the process of modification. In other words, it has a disadvantage that traffic which is sent through optical path for modification in optical hierarchical is no longer sent thereto during the modification.

In the existing studies for WDM network reorganization, the problems are solved by simultaneously reorganizing all elements of a network.

In the meantime, there is provided article 4 (A. Narura-Tam and E. Modiano, "Dynamic load balancing for WDM based packet networks", Proc. of IEEE INFOCOM, pp. 1010-1019, 2000), as another technique studied for modification between virtual topologies.

Figure 2A:
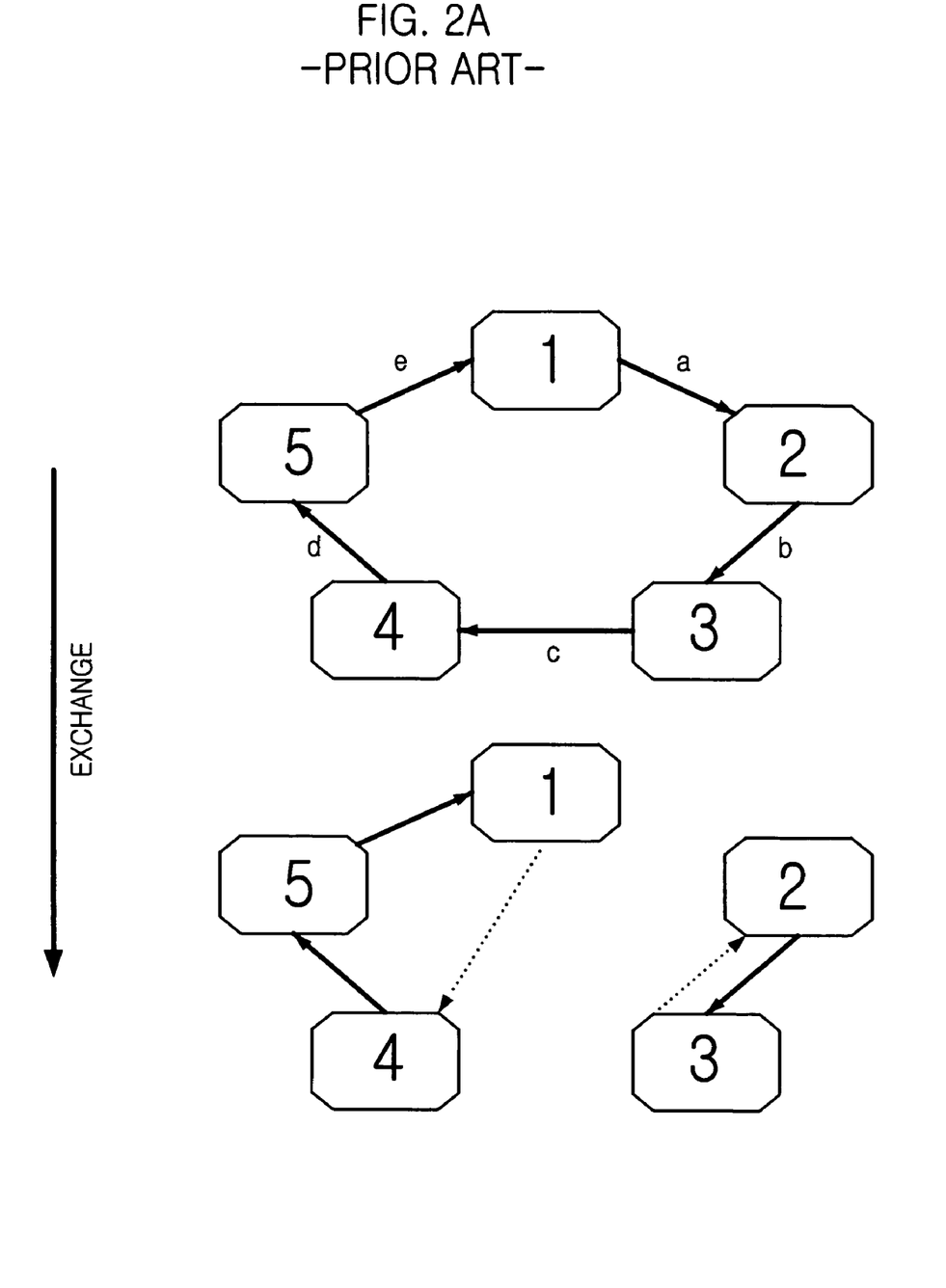
FIGS. 2A and 2B show illustrative drawings for explaining conventional branch exchange techniques.
Figure 2B:
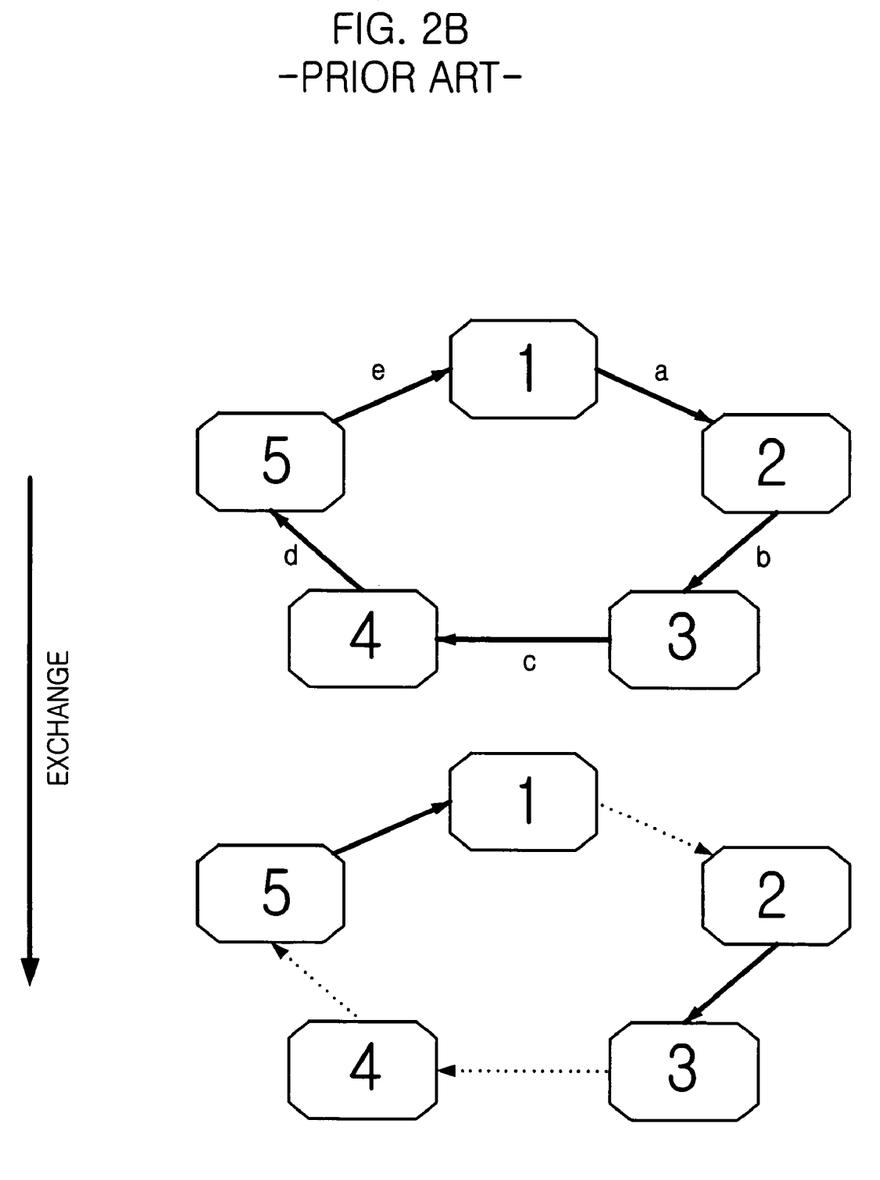

Article 4 is called DSSO (Dynamic Single Step Optimization) and provides a method which sequentially applies for branch exchange as in FIG. 2 until the target virtual topology is made.

FIGS. 2A and 2B illustrate conventional branch exchange techniques.

That is, in case of exchanging all possible optical paths, the technique modifies virtual topology by performing the branch exchange after searching an instance which is capable of most decreasing maximum link load.

However, the DSSO technique has a shortcoming that the number of instances of branch exchange to be considered increases by geometric progression as a size of network is large.

Further, it also has a problem that virtual topology determined by continuously performing branch exchange operation is not optimized solution in global area but optimized solution in local area.

To improve the above-mentioned problems, i.e., the assumption for knowledge of future traffic pattern and multilevel reorganization, there is proposed article 5 (A. Genata and B. Mukherjee, "Virtual-Topology Adaptation for WDM Mesh Networks Under Dynamic Traffic", IEEE Infocom 2002 Conference, vol. 1, pp. 48-56, June 2002).

Article 5 discloses a method for continuous measurement and adjustment in which the variation of traffic by time is monitored periodically and only the optical path being larger than a preset watermark value is reorganized. Through this method, the problem by the assumption that the future traffic pattern is known in the previous study is solved.

However, article 5 still has a problem that it is incapable of actively coping with a change of traffic pattern because an important system factor, e.g., watermark value which is initially set is used for measuring and adjusting.

That is, since article 5 uses a fixed watermark, it has a problem that reorganization of virtual topology must be frequently performed according to a variation of the entire traffic quantity during a short time.

A technique to solve the second problem in the prior art study, i.e., interruption phenomenon in the continuous traffic transfer which occurs in the process of multilevel transformation between virtual topologies is provided in article 6 (K. Bala et al., "Toward hitless reconfiguration in WDM optical networks for ATM transport", Proc. of IEEE GLOBECOM, pp. 316-320, 1996).

Figure 3A:
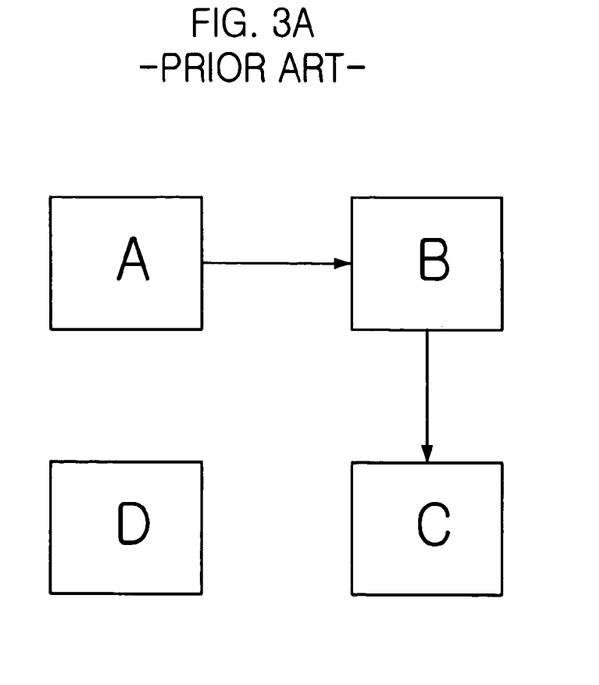
FIGS. 3A to 3C provide illustrative drawings for explaining a reorganization method of conventional Hitless topologies.
Figure 3B:
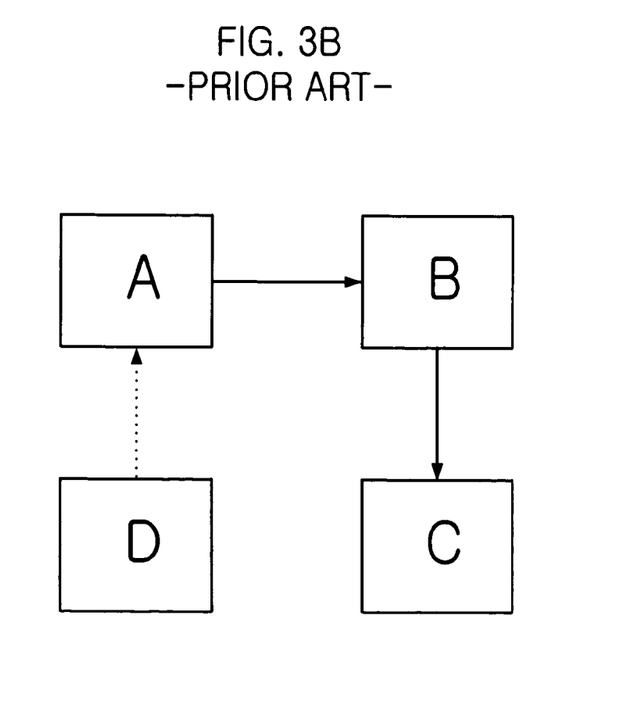
Figure 3C:
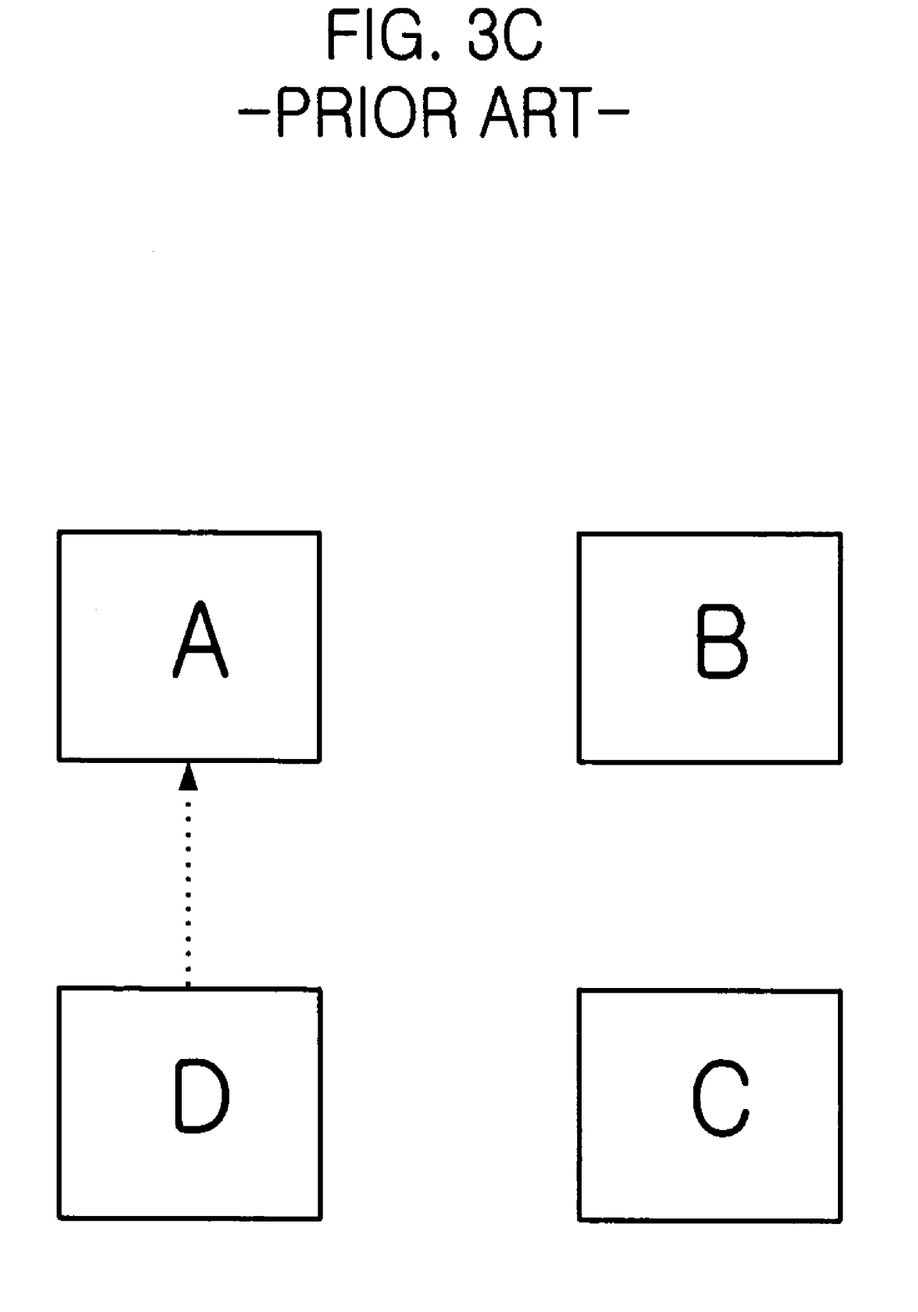

The technique proposed in article 6, which is called "Hitless" technique, establishes all links (optical path) which are newly needed in target virtual topology and eliminate only links routed to link of new virtual topology from original virtual topology. Drawing for this is FIG. 3.

FIGS. 3A to 3C are drawings for explaining reorganization method of prior art Hitless topology, where FIG. 3A indicates original topology, FIG. 3B indicates the status of topology in the transforming step and FIG. 3C is a drawing for explaining target topology.

As noted in the prior art study, it was already noted that there is a problem that the assumption that future traffic pattern is known is unrealistic.

Actual traffic pattern is constantly fluctuating; and thus its precise prediction is impossible.

Figure 4:
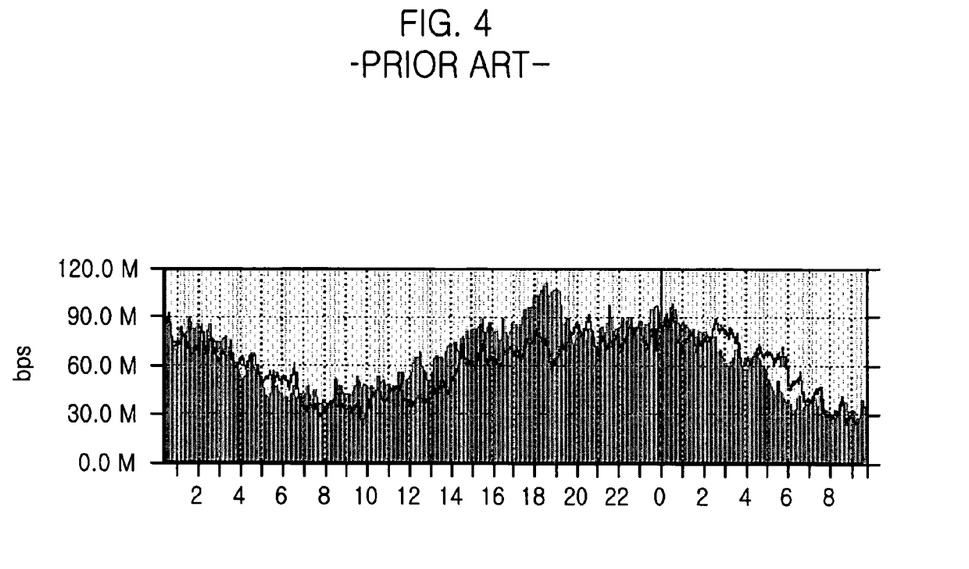
FIG. 4 is a graph for explaining general traffic measurement values obtained for a period of one day.

FIG. 4 is a graph for describing general traffic measurement value obtained for a period of one day wherein there are respectively shown rates of traffics for both directions of link.

As such, since this traffic rate is continuously varied, the study performed under the assumption that the future traffic pattern is known to have many problems.

SUMMARY OF THE INVENTION

It is, therefore, an object of the present invention to provide a reorganization method of a wavelength division multiplexing network using dynamic watermark for actively coping with a change of traffic pattern by determining the addition or elimination of an optical path and representing watermark value for deciding reorganization of virtual topology with a function of maximum or minimum optical path load at algorithm execution time.

Another object of the invention is to provide a storage medium which is capable of being read by a computer for realizing a reorganization method of wavelength division multiplexing network using dynamic watermark for actively coping with a change of traffic pattern by determining the addition or elimination of an optical path and representing a watermark value for deciding reorganization of virtual topology with a function of maximum or minimum optical path load at algorithm execution time.

To achieve the objects of the invention, in accordance with an aspect of the present invention, there is provided a method of wavelength division multiplexing network using dynamic watermark including a) collecting information on each node of each optical path from said each node; b) detecting optical paths having maximum load and minimum load from the collected information and computing a maximum value and minimum value based on the collected information; and c) resetting a new upper watermark and a new lower watermark based on the maximum value and the minimum value and performing the step a).

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE INVENTION

As shown in FIG. 4, in view of a variation of traffic according to time of actual backbone network, it can be seen that there is a slow variation at the interval of a period of almost one day. Further, in the slow variation, it can be seen that there are a rapidly varying part and a small variation, but there exists no large variation.

For instance, it can be seen from FIG. 4 that a degree of variation between 7 to 12 hours and 20 to 2 hours is smaller than that of other intervals of time.

The present invention provides the following based on the above consideration on actual traffic.

That is to say, in accordance with the invention, it is implemented to rapidly respond to rapidly varying traffic by setting the difference between upper watermark and lower watermark for deciding overload and low load to be smaller than the current value when traffic variation is rapid; and it is designed to perform operation the opposite when traffic variation is slow.

In the meantime, it needs many network resources to establish new optical paths. That is, it needs transmitting port and receiving port at each node along the physical path of an optical path and also needs wavelength for each link.

To do so, the present invention alternately performs establishment of new optical path for overload optical path and elimination of optical paths for low load optical path, thereby guaranteeing definite network resources in the process of the elimination of low load optical path.

Further, it is possible to achieve gradual load balance through alternate processes of overload and low load optical paths.

The above and other objects and features of the instant invention will become apparent from the following description of preferred embodiments taken in conjunction with the accompanying drawings. First, it should be noted that in case of giving reference numbers to elements in each drawing, same reference numbers are given to the same elements although they are shown in other drawings. Hereinafter, a preferred embodiment of the invention will be described with reference to the accompanying drawings.

Figure 5A:
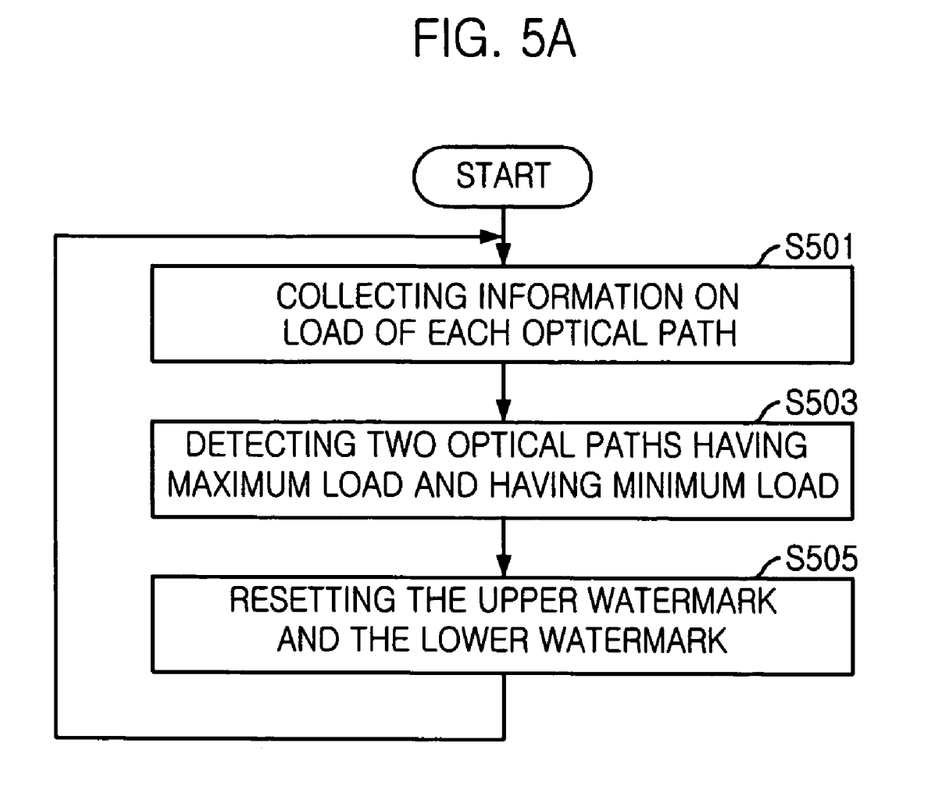
FIGS. 5A and 5B are flowcharts representing one embodiment for explaining a reorganization method of WDM network using dynamic watermark in accordance with the present invention.
Figure 5B:
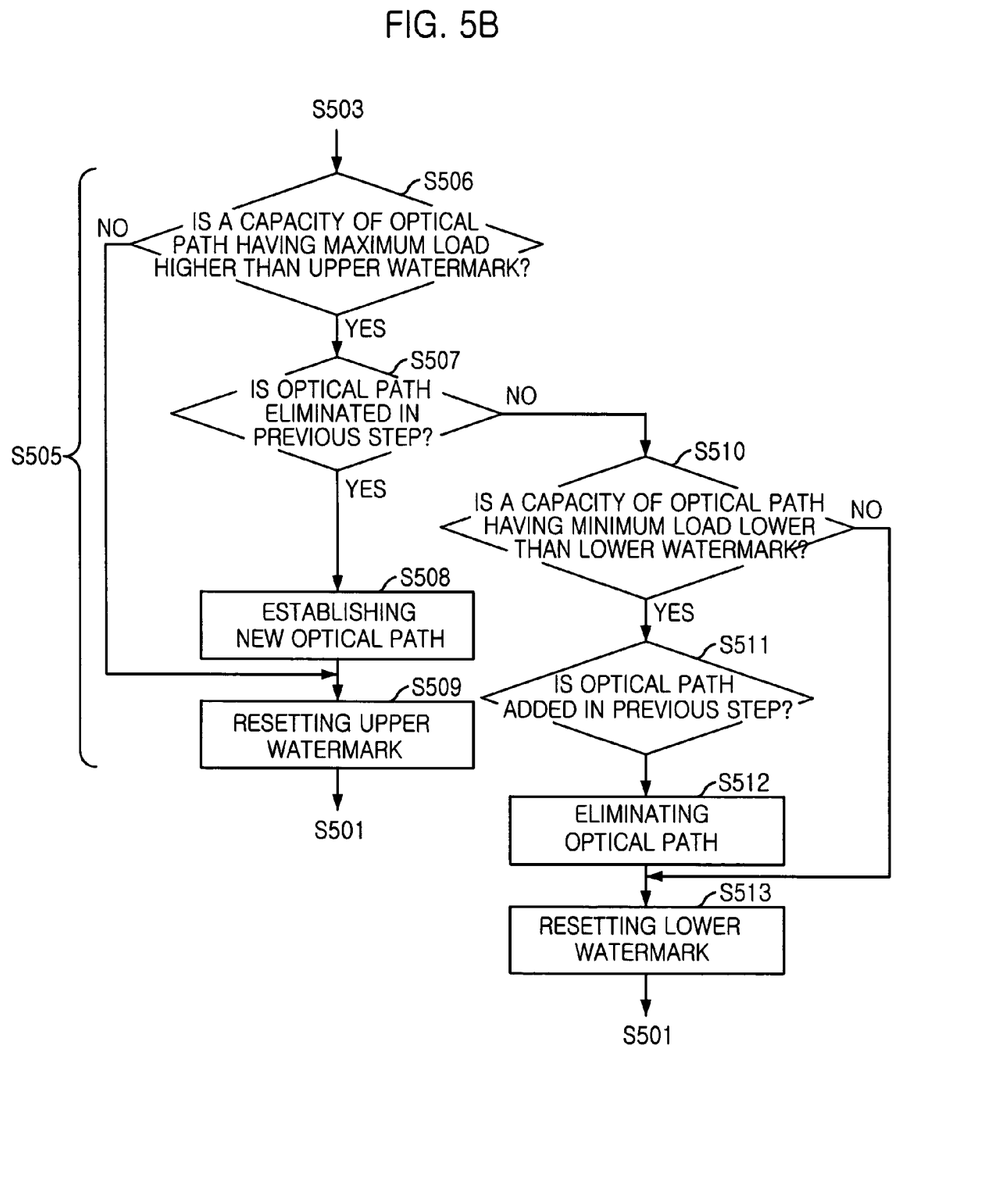

FIGS. 5A and 5B are flowcharts for explaining a preferred embodiment of reorganization method of WDM network using dynamic watermarks in accordance with the present invention.

Reorganization method of WDM network in accordance with the present invention is periodically and repeatedly carried out. Accordingly, in a previous period, an upper watermark and a lower watermark are decided. Initially, however, they may be given.

Referring to FIG. 5, in the reorganization method of WDM network of the invention, information on load of each optical path is first collected from each node at step S501. From the collected information, there are detected two optical paths: an optical path having maximum load and an optical path having minimum load at step S503. Based on a ratio of maximum load optical path to optical path capacity, a maximum value is computed. Also, a minimum value is computed based on a ratio of minimum load optical path to optical path capacity. After computing the maximum value and the minimum value, the high watermark and lower watermark are controlled at step S505. The control of the upper watermark is determined as:

$$WH_{t+1} = WH_t - \Delta \cdot \delta_H \qquad \text{Eq. (2)}$$

wherein $WH_t$ represents an upper watermark; and $\delta_H$ indicates a difference between an upper watermark value and MAX at a current time, MAX being a ratio of maximum load optical path to optical path capacity (i.e. $\delta_H = WH - MAX$).

Further, t is a time of current execution, t+1 is an execution time in a next period, and .DELTA. ranges from 0 to 1, as system factor.

The control of the lower watermark is determined as:

$$WL_{t+1} = WL_t - \Delta \cdot \delta_L \qquad \text{Eq. (3)}$$

wherein $WL_{t+1}$ is a lower watermark; and $\delta_L$ is a difference between a lower watermark value and MIN at a current time, MIN being a ratio of minimum load optical path to optical path capacity (i.e. $\delta_L = WL - MIN$).

Also, t represents a time of current execution, t+1 indicates an execution time in a next period, and $\Delta$ ranges from 0 to 1, as system factor.

FIG. 5B is a flowchart for explaining the step 505 of controlling the upper watermark and the lower watermark in detail in accordance with a preferred embodiment of the present invention.

Referring to FIG. 5B, if a capacity of the optical path having maximum load exceeds the upper watermark at step S506, it is determined whether or not an optical path was eliminated in previous steps at step S507. In case that the optical path was eliminated in a previous step, a new optical path is established and the load of the optical path having maximum load is distributed to the new optical path at step S508. After distributing, the upper watermark is reset by the Eq. 2 at step S509.

At the step 506, if a capacity of the optical path having maximum load does not exceed the upper watermark, the upper watermark is reset at step S509.

In the meantime, at the step 507, if the optical path was not eliminated in a previous step, it is determined whether the capacity of the optical path having minimum load is lower than lower watermark or not at step S510. If the capacity of the optical path having minimum load is lower than the lower watermark, it is determined whether or not an optical path was added in previous steps at step S511. If the optical path was added, the added optical path is eliminated at step S512.

After eliminating, the lower watermark is reset at step S513. In the meantime, at the step 510, if the capacity of the optical path having minimum load is lower than the lower watermark, the lower watermark is reset at step S513.

The above mentioned steps 501 to 513 may be repeatedly performed within a predetermined period.

In accordance with the invention, for network resources security of transmitting port and receiving port at each node in the above processes and the number of available wavelengths, etc., and load balance of each path, establishment of new optical path and elimination of optical path can be performed alternately.

That is to say, although a capacity of the optical path having the maximum load is larger than the upper watermark, if reorganization of recent virtual topology is related to establishment of new optical path, establishment of optical path is never made before any other optical path is eliminated.

As such, in a preferred embodiment of the invention, since watermark is actively adjusted, balance of load of optical path can be gradually made.

Further, if reorganization of recent virtual topology is related to elimination of optical path having low load and the current optical path overload is larger than the upper watermark, the new optical path is established. In this case, the origination node and the destination node of newly established optical path are the nodes of both ends of multi-hop traffic having maximum load on overload optical path.

Figure 6:
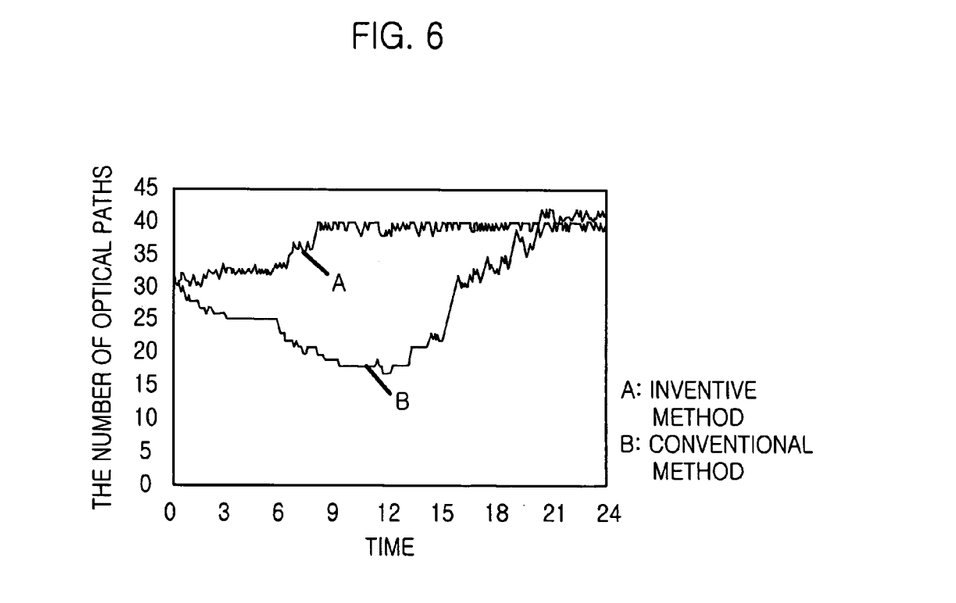
FIG. 6 is a graph for explaining a traffic measurement value for a period of one day in case of performing reorganization of network according to a preferred embodiment of the present invention.

FIG. 6 is a graph for describing one embodiment of traffic measurement value of a period of one day in case of performing network reorganization in accordance with the invention, wherein A represents the inventive method while B indicates the prior art method.

As shown in FIG. 6, it will be seen that the network reorganization method of the invention entirely uses a larger number of optical paths and the number of optical paths used in the invention is almost constant if a certain time is passed after performing the initial algorithm.

That is, the number of optical paths needed for load balance is gradually varied but the number thereof is almost constant after a certain amount of time.

Figure 7A:
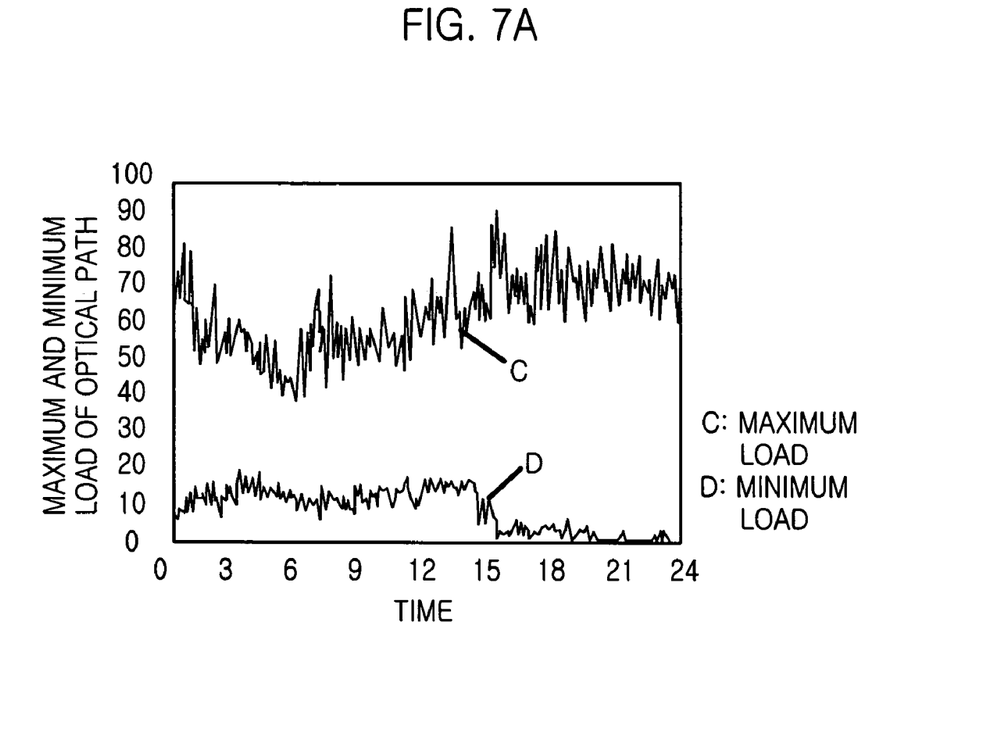
FIGS. 7A and 7B are graphs for explaining variations of maximum and minimum optical path loads for a period of one day in case of performing reorganization of network in accordance with a preferred embodiment of the present invention.
Figure 7B:
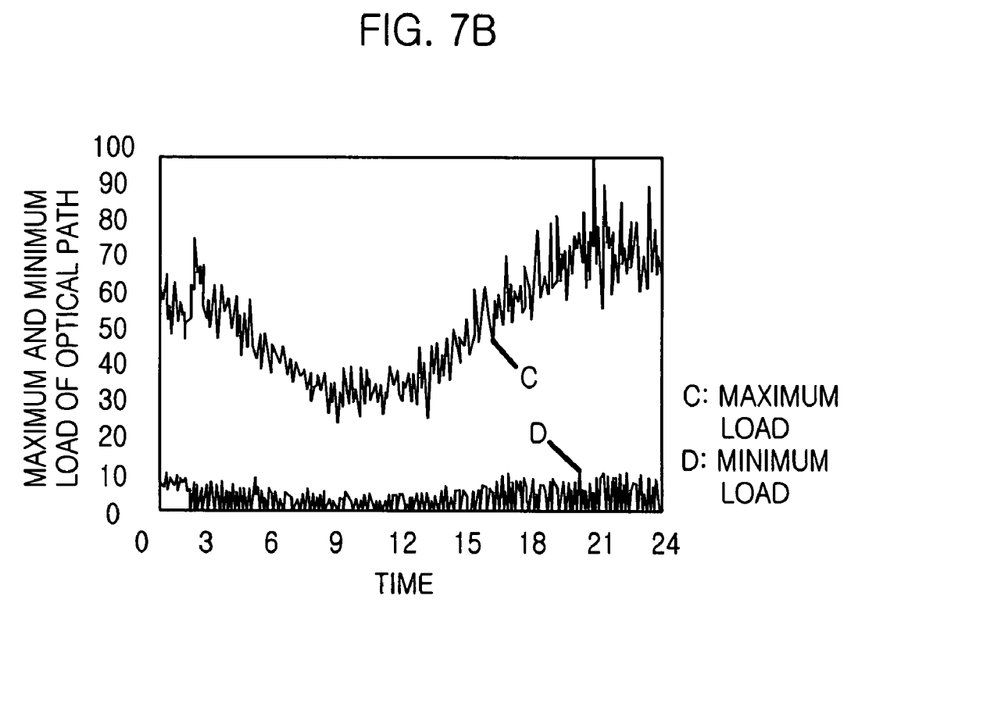

FIGS. 7A and 7B are graphs for explaining the variation of the maximum and the minimum optical path loads for one day in case the network reorganization is performed in accordance with the invention, wherein FIG. 7A corresponds to the prior art method and FIG. 7B corresponds to the inventive method.

In the examination of the invention, the upper watermark is fixed to 70%, while the lower watermark is fixed to 10%. Further, the execution period in the examination is set by 300 seconds.

In the drawings, the horizontal axis represents a flow of time and the vertical axis indicates a ratio of load to maximum capacity of optical path as a percentage.

As shown in FIG. 7A, it can be seen that, in the prior art network reorganization method, there is rough load balance within the range of the upper watermark to the lower watermark which are initially set for 24 hours.

In case of the minimum optical path load after 15 hours, it can be seen that the interval of value which is smaller than the lower watermark of 10% and is within 10% range therefrom continues. This is because it gives priority in the establishment of new optical path to decrease load of overload optical path rather than elimination of inefficient optical path.

In the interval that the minimum optical path load is continuously smaller than the lower watermark, that is, in the maximum optical path load after 15 hours, it can be seen that intervals larger than the upper watermark of 70% frequently occurred. These are intervals occurring due to non-elimination of low load optical path because it gives priority in the establishment of new optical path.

As shown in FIG. 7B, in accordance with the network reorganization method of the present invention, the upper watermark and the lower watermark are actively varied. In the examination, a value of $\Delta$, which is a factor for determination of dynamic watermark ranging from 0 to 1, is set to 0.5. That is, watermark for next execution in the examination is decided by adjusting it by ½ of a difference between the current optical path and the current watermark value.

In the determination of dynamic watermark, because the next watermark is decided as the difference between the current watermark value and load value of measured optical path, it can be seen that the watermark is also varied together according to a variation of traffic pattern.

That is, virtual topology is reorganized based on a variation of the watermark which is actively made by a variation of traffic pattern rather than the passive prior art network reorganization method.

In FIG. 7B, it can be seen that, in the interval of 20 to 22 hours of maximum optical load, many traffics are concentrated thereon. This is because the traffic quantity increases suddenly in the interval of 20 to 22 hours and upper watermark rapidly increases due to the phenomenon.

Meanwhile, to find the difference in view of load balance of network reorganization method using the prior art fixed watermark and network reorganization method using dynamic watermark of the invention, loads of all optical paths for every execution period during each of 24, 48, 72, 96, and 120 hours, are collected; and the standard deviation of the collected loads is calculated.

The results are shown in Table 1 below.

TABLE 1

|  | 24 hours | 48 hours | 72 hours | 96 hours | 120 hours |
|---|---|---|---|---|---|
| Fixed Watermark | 103.62 | 99.77 | 96.16 | 97.19 | 98.56 |
| Dynamic Watermark | 79.82 | 77.54 | 75.03 | 73.91 | 74.21 |

As a scale of the degree of load balance, the standard deviation of all optical paths is used; and it can be seen from Table 1 above that the network reorganization method of the invention is superior to the prior art method by about 23% in view of load balance.

In accordance with the present invention as described above, the virtual topology is reorganized only if it is determined that the reorganization is needed as the result of continuous observation of the flow of network traffic, and thereby, watermark for deciding reorganization of virtual topology is actively varied.

That is, overload, which occurs on one optical path when network concentration occurs, is solved by establishing a new optical path when it becomes larger than upper watermark, while low load is solved by eliminating inefficient low load optical paths.

Further, the entire load balance for optical path can be made by gradually decreasing difference of watermark representing upper and lower.

The present invention as described above can be implemented by software programs and stored in a storage medium (CD-ROM, RAM, ROM, Floppy Disk, Hard Disk, Optical magnetic Dist, etc.), which is capable of being read by computer.

As a result, the present invention is capable of actively coping with a change of traffic pattern by determining addition or elimination of optical path and representing watermark value for deciding reorganization of virtual topology with a function of maximum or minimum optical path load at algorithm execution time.

Moreover, the present invention is capable of actively coping with a change of traffic pattern by deciding a watermark to be used in a next period by considering the status of the current network.

While the present invention has been described with respect to the particular embodiments, it will be apparent to those skilled in the art that various changes and modifications may be made without departing from the spirit and scope of the invention as defined in the following claims.

What is claimed is:

1. A method of organizing a wavelength division multiplexing (WDM) network using a dynamic watermark, the method comprising:
providing an upper watermark and a lower watermark for a current period;
collecting load information for optical paths of the WDM network from nodes on the optical paths;
detecting optical paths having a maximum load and a minimum load from the collected load information and computing a maximum value MAX and a minimum value MIN based on the collected load information, wherein the maximum value MAX is a ratio of the maximum load of the maximum load optical path to optical path capacity and the minimum value MIN is a ratio of the minimum load of the minimum load optical path to optical path capacity;
computing the upper watermark and the lower watermark for a next period based on the maximum value MAX and the minimum value MIN; and
setting a number of optical paths among nodes of the WDM network for data transmission in the next period based on the computed upper watermark and the lower watermark for the next period,
wherein the upper watermark for the next period is computed by an equation as follows:

$$WH_{t+1} = WH_t - \Delta \cdot \delta_H,$$

wherein $WH_{t+1}$ represents the upper watermark for the next period, $WH_t$ represents the upper watermark for the current period, $\delta_H$ indicates a difference between the upper watermark for the current period $WH_t$ and the maximum value MAX in the current period, and $\Delta$ is a system factor having a value greater than 0 but less than or equal to 1.

2. The method as recited in claim 1, further comprising adding a new optical path if the maximum value MAX is larger than the upper watermark for the current period $WH_t$.

3. A method of organizing a wavelength division multiplexing (WDM) network using a dynamic watermark, the method comprising:
providing an upper watermark and a lower watermark for a current period;
collecting load information for optical paths of the WDM network from nodes on the optical paths;
detecting optical paths having a maximum load and a minimum load from the collected load information and computing a maximum value MAX and a minimum value MIN based on the collected load information, wherein the maximum value MAX is a ratio of the maximum load of the maximum load optical path to optical path capacity and the minimum value MIN is a ratio of minimum load of the minimum load optical path to optical path capacity; and
computing the upper watermark and the lower watermark for a next period based on the maximum value MAX and the minimum value MIN; and setting a number of optical paths among nodes of the WDM network for data transmission in the next period based on the computed upper watermark and the lower watermark for the next period, wherein the lower watermark for the next period is computed by an equation as follows:

$$WL_{t+1} = WL_t - \Delta \cdot \delta_L,$$

wherein $WL_{t+1}$ represents the lower watermark for the next period, $WL_t$ represents the lower watermark for the current period, $\delta_L$ indicates a difference between the lower watermark for the current period $WL_t$ and the minimum value MIN in the current period, and $\Delta$ is a system factor having a value greater than 0 but less than or equal to 1.

4. The method as recited in claim 3, further comprising of eliminating an optical path if the minimum value MIN is smaller than the lower watermark for the current period $WL_t$.

* * * * *

UNITED STATES PATENT AND TRADEMARK OFFICE
CERTIFICATE OF CORRECTION

| | | |
|---|---|---|
| PATENT NO. | : 7,609,965 B2 | Page 1 of 1 |
| APPLICATION NO. | : 10/744794 | |
| DATED | : October 27, 2009 | |
| INVENTOR(S) | : Jung-Joo Nahm | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1571 days.

Signed and Sealed this

Twelfth Day of October, 2010

David J. Kappos
*Director of the United States Patent and Trademark Office*